United States Patent

Neumann et al.

[11] Patent Number: 5,580,937
[45] Date of Patent: Dec. 3, 1996

[54] CURABLE BINDER AND PROCESS FOR ITS PREPARATION

[75] Inventors: Uwe Neumann, Bad Schwalbach; Michael Hoenel, Wiesbaden; Paul Oberressl, Wiesbaden; Marion Keller, Wiesbaden, all of Germany

[73] Assignee: Hoechst Aktiengesellschaft, Germany

[21] Appl. No.: 992,856

[22] Filed: Dec. 16, 1992

[30] Foreign Application Priority Data

Dec. 18, 1991 [DE] Germany ............... 41 41 776.3

[51] Int. Cl.$^6$ .................................................. C08F 20/00
[52] U.S. Cl. ........................................ 525/438; 525/533
[58] Field of Search ............................. 525/438, 533

[56] References Cited

U.S. PATENT DOCUMENTS

| | | | |
|---|---|---|---|
| 4,223,097 | 9/1980 | Johannes et al. | 525/438 |
| 4,307,153 | 12/1981 | Bernelin et al. | 525/438 |
| 4,340,698 | 7/1982 | DeJongh et al. | 525/438 |
| 4,507,441 | 3/1985 | Goring | 525/438 |
| 4,740,580 | 4/1988 | Merck et al. | 525/438 |
| 5,006,612 | 4/1991 | Danick et al. | 525/438 |
| 5,168,110 | 12/1992 | Van Den Elshout et al. | 525/438 |
| 5,177,159 | 1/1993 | Steinmann et al. | 525/438 |

FOREIGN PATENT DOCUMENTS

| | | |
|---|---|---|
| 0415879 | 3/1991 | European Pat. Off. . |
| 2577231 | 8/1986 | France . |

*Primary Examiner*—John C. Bleutge
*Assistant Examiner*—Randy Gulakowski
*Attorney, Agent, or Firm*—Bierman & Muserlian

[57] ABSTRACT

Curable binder composed of
  A. a polyepoxide and
  B. a carboxyl group-containing polymer which is obtained by reacting a carboxy-functional polyester b1 with substoichiometric amounts of an epoxy compound b2.

The binder according to the invention has a high reactivity coupled with good storage stability.

15 Claims, No Drawings

CURABLE BINDER AND PROCESS FOR ITS PREPARATION

The invention relates to a curable synthetic resin which contains epoxide groups and is curable at elevated temperature, a process for its preparation and its use as binder for stoving coatings, in particular for packaging coatings and very particularly for coatings for the interior of cans.

It is known that epoxy resins can be cured with acid polyesters at temperatures in the range of 150°–200° C. to give sterilization-proof coatings.

Disadvantages are the long stoving times and the occasional poor compatibility of the polyester with the epoxy resin, which can lead to surface defects and sterilization losses in the coating. On the other hand, a one-component stoving system shows an extremely limited storage stability at room temperature, which is expressed by a rapid rise in the viscosity.

A curable binder has now been found which is composed of a polyepoxide A and a carboxyl group-containing polymer B, the component B being obtained by reacting a carboxy-functional polyester b1 with substoichiometric amounts of an epoxy compound b2.

Surprisingly, it has been found that coating mixtures which contain the binder according to the invention have better compatibility of the components and a higher reactivity without the viscosity of the mixture rising significantly at room temperature over a period of several months.

Because of their high reactivity, storage stability and solubility, the binders according to the invention can be used for diverse applications. They can be used wherever use is made of stoving temperatures above 100° C. (preferably above 140° C.), for example in the coating field, such as base coats, top coats, single-coat coatings, shock-drying systems for coil coating and for coating preserve cans.

The high reactivity of the binders is particularly evident when stoving is carried out within very short periods, for example 1 to 3 minutes, and at relatively high temperatures, for example 200°–250° C. (temperature of the article).

In some cases the reactivity can be further considerably increased by the addition of catalysts. This has a particularly beneficial effect on the required stoving time, but also on the required stoving temperature. Suitable catalysts, which, for example, can be present in a proportion of 0.01 to 5, preferably 0.05 to 1.5% by weight, with respect to the total solids content, are, inter alia, alkali metal salts, basic catalysts of inorganic or organic type, such as the lithium, sodium or potassium salts of weak organic and inorganic acids (for example acetic acid, benzoic acid, boric acid, 2-ethyl-hexanoic acid and other aliphatic carboxylic acids), titanium compounds, tin compounds, such as tin-II octoate, dibutyltin oxide, dibutyltin dichloride and dibutyltin dilaurate, organic bases, such as trialkylamines, for example tributylamine, triethanolamine or benzyldimethylamine, cyclic bases, such as diazabicyclooctane, imidazole, aryl- and alkyl-imidazoles, imidazolines, organic and inorganic phosphorus compounds, such as triphenyl phosphite, phosphoric acids, phosphoric acid monoesters of aliphatic alcohols, acids, such as p-toluenesulfonic acid and 1,5-naphthalenedisulfonic acid, and heteropolyacids, in each case on their own or as a mixture, for example combinations of the abovementioned compounds having an alkaline reaction with others of the abovementioned catalysts.

The coatings can be applied to a plurality of substrates insofar as these withstand the curing temperatures of the coating. Suitable substrates are, for example, ceramic, wood, glass, concrete, plastics and preferably metals or alloys, such as, for example, iron, zinc, tin, titanium, copper, aluminum, steel, magnesium, brass or bronze, it being possible for the substrates (metals) to be used on their own or in a composite and to be pretreated or not pretreated. Suitable pretreatments are, for example: suitable thermal, mechanical or chemical processes to increase the adhesiveness and corrosion resistance. However, the binders according to the invention are also characterized by outstanding adhesion to metal substrates which have not been pretreated.

The binders according to the invention are suitable in particular for the production of corrosion-protective, chemical-resistant, sterilization-proof and similar coatings and intermediate coatings for very diverse fields of application, such as, for example: lining articles which come into contact (even for a prolonged period) with aggressive media such as propellants, solvents or foodstuffs.

A particularly preferred field of application comprises one-coat coatings on sheet metal which is brought into its use form by subsequent deep drawing, beveling, molding, embossing or the like.

The binders according to the invention are suitable in particular, in the case of appropriate choice of components A and B, for applications where outstanding sterilization-proof properties have to be achieved in a thin layer (0.5–20 μm, preferably 2–10 μm and very particularly preferentially 3–8 μm), for example by deep drawing.

The binders can be used on their own or as a mixture with other binders appropriate for the purpose and/or polymers or flow agents, adhesives, catalysts or similar additives known to those skilled in the art.

Binders suitable for combination are OH group-containing amine, urea, melamine, guanamine, novolak and in particular phenolic resins as well as OH group-containing polyesters or homopolymers and/or copolymers. If suitably chosen, the combination partners can be added in an amount of up to in total 50% by weight, preferably up to 30% by weight and very particularly preferentially up to 10% by weight.

The binders can be applied (spraying, rolling, dipping) in the form of a clear vanish, powder coating and/or using suitable (acid-resistant) pigments and fillers. The following may be mentioned as examples of pigments and fillers: titanium dioxide, graphite, carbon black, zinc chromate, strontium chromate, barium chromate, lead chromate, lead cyanamide, lead silicochromate, calcium molybdate, manganese phosphate, zinc oxide, cadmium sulfide, chromium oxide, zinc sulfide, nickel titanium yellow, chromium titanium yellow, iron oxide black, iron oxide red, ultramarine blue, phthalocyanine complexes, naphthol red or the like. In this context it is surprisingly of no importance whether the color-imparting pigments are of inorganic or organic type. Metallic pigments or those of metallic appearance, such as aluminum, aluminum bronzes of diverse color shades, copper, tungsten bronzes and antimony and arsenic sulfide bronzes, which can be used for the so-called "metallic coatings", are also suitable. Suitable fillers are, for example, talc, mica, kaolin, chalk, ground quartz, ground asbestos, ground slate, barium sulfate, silicates, glass fibers, organic fibers or the like.

The following may be mentioned as examples for polyepoxide A: the epoxy ethers of polyhydric phenols (resorcinol, hydroquinone, bis(4-hydroxyphenyl)methane, bis(2-hydroxyphenyl)methane, 4-hydroxyphenyl(2-hydroxyphenyl)methane, bis(4-hydroxy-3-methylphenyl)methane, bis(4-hydroxy-3,5-dibromophenyl)methane, 2,2-bis(4-hydroxyphenyl)propane, 1,1-bis(4-hydroxyphenyl)cyclohexane and also phenol-formaldehyde condensation products) and polyhydric alcohols (butanediols, hexanediols, glycerol, pentaerythritol, sugar alcohols and others). Oligomers of the epoxy resins described above can also be used. A detailed list of suitable epoxy compounds is given in the handbook "Epoxidverbindungen und Epoxidharze" ("Epoxy Compounds and Epoxy Resins") by A. M. Paquin, Springer Verlag, Berlin 1958, Chapter IV and in Lee, Neville "Handbook of Epoxy Resins", 1967, Chapter 2. Epoxy resins based on 2,2-bis(4-hydroxyphenyl)propane (bisphenol A) having an average molecular weight of 340–8000 are particularly preferred. The above polyepoxides can be used on their own or as a mixture. They can optionally also be used in mixtures with monoepoxides.

In order to prepare the carboxyl group-containing polymer (B), the first reaction step is carried out in the manner already known, by a condensation reaction in the melt or by azeotropic distillation with suitable entraining agents. The polyesters b1 are prepared from the free acids or their anhydrides and alcohols using catalysts at temperatures of 140°–230° C. Aromatic, aliphatic or cycloaliphatic carboxylic acids are used for this reaction.

Preferred aromatic polycarboxylic acids are derivatives of benzene and/or of naphthalene and/or of benzophenone, such as terephthalic acid, isophthalic acid, phthalic acid, trimesic acid, trimellitic acid, benzene-1,2,3-tricarboxylic acid, pyromellitic acid, naphthalane-1,4-dicarboxylic acid, naphthalene-2,6-dicarboxylic acid, naphthalene-1,8-dicarboxylic acid, naphthalene-1,4,5,8-tetracarboxylic acid, benzophenone-4,4'-dicarboxylic acid, benzophenone-3,3'-dicarboxylic acid or benzophenone-3,3',4,4'-tetracarboxylic acid, or the anhydrides thereof, insofar as these are available.

Preferred aliphatic polycarboxylic acids are succinic acid, dodecenylsuccinic acid, adipic acid, 2,2,4-trimethyladipic acid, 2,4,4-trimethyladipic acid, glutaric acid, butane-1,2,3,4-tetracarboxylic acid, citric acid, pimelic acid, suberic acid, azelaic acid, dodecanedioic acid or so-called fatty acid dimers.

Preferred cycloaliphatic polycarboxylic acids are hexahydrophthalic acid, hexahydroisophthalic acid, hexahydroterephthalic acid, tetrahydrophthalic acid, bicyclo-[2.2.1]hept-5-ene-2,3-dicarboxylic acid, tetrahydrofuran-2,3,4,5-tetracarboxylic acid, cyclopentane-1,2,3,4-tetracarboxylic acid or methylhexahydrophthalic acid, or the anhydrides thereof, insofar as these are available.

The above polyfunctional carboxylic acids can be used on their own or as a mixture. They can optionally also be used in mixtures with monocarboxylic acids.

Alcohols for the synthesis of the polyesters which may be mentioned are: polyhydroxy compounds, such as, for example, ethane-1,2-diol, propane-1,2-diol, propane-1,3-diol, 2,2-dimethylpropane-1,3-diol, 2-ethyl-2-methyl-propane-1,3-diol, butane-1,4-diol, hexane-1,6-diol, dodecane-1,12-diol, bis(4-hydroxycyclohexyl)methane, 2,2-bis(4-(2-hydroxyethoxy)phenyl)propane, 3(4),8(9)-bis-(hydroxymethyl)tricyclo[5.2.1.0$^{2,6}$]decane, 1,1,1-trimethylolethane, 1,1,1-trimethylolpropane, pentaerythritol, dipentaerythritol, bis(2,2-bis-(hydroxymethyl)butyl) ether, 1,4-bis(hydroxymethyl)cyclohexane, 2,2-bis-(hydroxymethyl)propionic acid, glycerol and diglycerol, optionally together with monohydric alcohols such as butanol, octanol, lauryl alcohol, ethoxylated or propoxylated phenols or alkylphenols or fatty alcohols, in each case on their own or as a mixture.

The polyester b1 has an acid number of 40–800, preferably 80–650.

In a second reaction step the polyester b1 is reacted in a solvent or in the melt in a stoichiometric deficiency with an epoxy compound b2. The ratio of acid groups to epoxy groups is 100:1 to 1.1:1, preferably 40:1 to 2:1 and very particularly preferentially 30:1 to 10:1.

Preferred epoxides b2 for the reaction with the polyester b1 are predominantly epoxy compounds having more than one epoxy group per molecule. Essentially the same epoxy compounds as mentioned under (A) can be used. Epoxy resins based on 2,2-bis(4-hydroxyphenyl)propane (bisphenol A) having an average molecular weight of 340–8000 are particularly preferred. The above polyfunctional epoxides can be used on their own or as a mixture. They can optionally also be used in mixtures with monoepoxides.

The solvents used are aprotic, polar solvents, such as, for example, ketones: butanone, 4-methylpentan-2-one, isophorone, 3,3,5-trimethylcyclohexanone, 2,6-dimethyl-heptan-4-one, 2,4-dimethylpentan-3-one or 2-methoxy-2-methylpentan-4-one, or ethers: 1,2-dimethoxyethane, diethylene glycol dimethyl ether, dipropylene glycol dimethyl ether or propylene glycol dibutyl ether, or esters: ethyl pivalate, 1-ethoxypropyl 2-acetate, 1-methoxypropyl 2-acetate, ethyl 3-ethoxypropionate or 1,2-propylene diacetate. Mixtures of the abovementioned solvents can also be used.

The catalysts which can be used are those described above for stoving.

The polyepoxide A and the carboxyl group-containing polymer B are mixed homogeneously at 50° C.–120° C. in a ratio of 95:5 to 40:60, preferably 15:1 to 3:1 (with respect to solid resin).

The binder is then ready for use.

EXAMPLES:

Example (1)

Component A:
Beckopox EP 304 (Hoechst AG), which has a EV (epoxide equivalent weight) of 915, is dissolved in 1-ethoxypropyl acetate in a ratio of 1:1.

Component B:
338 g of 1,2,3,4-butanetetracarboxylic acid bisanhydride (1.71 mol) and 316 g of 2,2-bis(4-(2-hydroxyethoxy)phenyl)propane (1.00 mol) are esterified in the melt. After 5 hours the following acid numbers are found: alcoholic: 130, aqueous: 415. The polyester is taken up in an amount of bis(methoxyethyl) ether such that an 80% strength solution is formed and 9.1 g of Genapol T-080 (fatty alcohol, C16–C18 base reacted with, on average, eight mol of ethylene oxide, Hoechst AG) and the stoichiometric amount of water are then added in order to split the remaining anhydride rings. 601 g of an epoxy resin based on bisphenol A and having an EV of 1200 are then added at 80° C. The reaction mixture is kept at this temperature until the EV has risen above 20,000. The mixture is then diluted to a solids content of 50% using 1-ethoxypropyl acetate.

The solutions of components A and B are finally mixed in a ratio of 5.2:1.0.

Example (2)

Component A:
Beckopox EP 307 (Hoechst AG), which has an EV (epoxide equivalent weight) of 1730, is dissolved in ethyl 3-ethoxypropionate in a ratio of 1:1.

Component B:
351 g of trimellitic anhydride (1.83 mol) and 76 g of propylene glycol (1.00 mol) are esterified azeotropically with xylene. After nine hours the following acid numbers are found: alcoholic: 231, aqueous: 460. The polyester is taken up in an amount of 4-methoxy-4-methylpentan-2-one such that a 75% strength solution is formed and 5.9 g of Genapol T-050 (fatty alcohol, C16–C18 base, reacted with on average five mol of ethylene oxide, Hoechst AG) and the stoichiometric amount of water are then added in order to split the remaining anhydride rings. 427 g of an epoxy resin based on bisphenol A and having an EV of 1600 are then added at 80° C. The reaction mixture is kept at this temperature until the EV has risen above 20,000. The mixture is then diluted to a solids content of 50% using ethyl 3-ethoxypropionate.

The solutions of components A and B are finally mixed in a ratio of 4.2:1.0.

Example (3)

Component A:

Epikote 1008 (Shell AG), which has an EV (epoxide equivalent weight) of 2515, is dissolved in 2-ethoxyethyl acetate in a ratio of 1:1.

Component B:

373 g of trimellitic anhydride (1.94 mol) and 62 g of ethylene glycol (1.00 mol) are esterified azeotropically with xylene. After nine hours the following acid numbers are found: alcoholic: 243, aqueous: 495. The polyester is taken up in an amount of bis(methoxyethyl) ether such that a 75% strength solution is formed and 6.1 g of Arcopal N 090 (nonylphenol, reacted with on average nine mol of ethylene oxide, Hoechst AG) and the stoichiometric amount of water are then added in order to split the remaining anhydride rings. 435 g of an epoxy resin based on bisphenol A and having an EV of 1600 are then added at 80° C. The reaction mixture is kept at this temperature until the EV has risen above 20,000. The mixture is then diluted to a solids content of 50% using 2-ethoxyethyl acetate.

The solutions of components A and B are finally mixed in a ratio of 4.2:1.0.

Example (4)

Component A:

An epoxy resin, prepared from 0.83 eq of Beckopox EP 140, 0.17 eq of 1,6-hexanediol diglycidyl ether and 0.91 eq of bisphenol A by a known process, which has an EV (epoxide equivalent weight) of 3200, is dissolved in 3-methoxybutyl acetate in a ratio of 45:55.

Component B:

393 g of 1,2,3,4-cyclopentanetetracarboxylic acid bis-anhydride (1.87 mol) and 3.16 g of 2,2-bis(4-(2-hydroxyethoxy)phenyl)propane (1.00 mol) are esterified in the melt. After five hours the following acid numbers are found: alcoholic: 148, aqueous: 435. The polyester is taken up in an amount of 4-methylpentan-2-one such that an 80% strength solution is formed and 9.8 g of Sapogenat T-080 (tris-tert.-butylphenol, reacted with on average eight mol of ethylene oxide, Hoechst AG) and the stoichiometric amount of water are then added in order to split the remaining anhydride rings. 709 g of an epoxy resin based on bisphenol A and having a EV of 1200 are then added at 80° C. The reaction mixture is kept at this temperature until the EV has risen above 20,000. The mixture is then diluted to a solids content of 45% using 3-methoxybutyl acetate.

The solutions of components A and B are finally mixed in a ratio of 5.7:1.0.

Example (5)

Component A:

Epikote 1008 (Shell AG), which has an EV (epoxide equivalent weight) of 2650, is dissolved in 3-methoxybutyl acetate in a ratio of 45:55.

Component B:

464 g of tetrahydrophthalic anhydride (3.05 mol) and 134 g of 1,1,1-trimethylolpropane (1.00 mol) are esterified in the melt. After five hours the following acid numbers are found: alcoholic: 286, aqueous: 291. The polyester is taken up in an amount of 4-methylpentan-2-one such that an 80% strength solution is formed and 6.1 g of Arcopal N 090 (nonylphenol, reacted with on average nine mol of ethylene oxide, Hoechst AG) are then added. 183 g of Beckopox EP 140 are then added at 80° C. The reaction mixture is kept at this temperature until the EV has risen above 20,000. The mixture is then diluted to a solids content of 45% using 3-methoxybutyl acetate.

The solutions of components A and B are finally mixed in a ratio of 5.7:1.0.

Application testing

A white coating composition is prepared using the above-mentioned binders and stoved in a thickness of 5–6 μm on tinplate for 12 min at 190° C. The white coating composition has the following composition (parts=parts by weight):

100 parts of binder 50 parts of titanium dioxide CL 23-10 (Kronos)

40 parts of ethoxypropyl acetate 0.5 part of 40% strength phosphoric acid

The Comparison Example (V) is based on a binder system corresponding to the prior art. It is composed of a hardener from Ciba (XB 3380, 15 parts) and an epoxy resin from Shell AG (Epikote 1007, 85 parts) in 40% strength solution in ethoxyethanol.

| Binder from Example | 1 | 2 | 3 | 4 | 5 | V |
| --- | --- | --- | --- | --- | --- | --- |
| Gloss (%) 60° angle(a) | 95 | 96 | 94 | 90 | 94 | 60 |
| Adhesion (cross-hatch)(b) | 0 | 0 | 0–1 | 0–1 | 0–1 | 0 |
| Impact indentation (inch-pound)(c) | >40 | >40 | >40 | >40 | >40 | >40 |
| Acetone test (duplicate mixtures) | >100 | >100 | >100 | >100 | >100 | 10 |
| Sterilization-proof properties(d) | resistant | resistant | resistant | resistant | resistant | blister formation |

(a) according to Lange
(b) DIN 53 151
(c) DIN 55 669
(d) in 2% strength lactic acid, 1 h at 129° C. (= 1.5 bar)

We claim:

1. A curable binder consisting essentially of

A. a polyepoxide, and

B. a carboxyl group-containing polyester which is obtained by reacting a carboxy functional polyester b1 with an epoxy compound b2 in such amounts that the ratio of the number of acid groups in b1 to the number of epoxy groups in b2 is from 2:1 to 100:1.

2. The curable binder as claimed in claim 1, wherein the components A and B are present in a ratio of between 95:5 and 40:60.

3. The curable binder of claim 2 wherein the components A and B are present in a ration of 15:1 to 3:1.

4. The curable binder as claimed in claim 1, wherein the component A is selected of at least one representative from the groups consisting of:

1. epoxide ethers of monomeric polyhydric alcohols or phenols,
2. oligomers or polymers of representatives of group 1 and
3. mixtures of at least one representative from 1 and/or 2 and a monoepoxide.

5. The curable binder as claimed in claim 1, wherein the carboxy-functional polyester (b1) is the condensation product of at least one polycarboxylic acid selected from the group consisting of:
   a) aromatic polycarboxylic acids,
   b) aliphatic polycarboxylic acids,
   c) cycloaliphatic polycarboxylic acids, and
   d) mixtures of at least one polycarboxylic acid from groups a–c with at least one monocarboxylic acid,
with at least one polyhydroxy compound or with a mixture of at least one polyhydroxy compound and at least one monohydroxy compound.

6. The curable binder as claimed in claim 5, wherein the monohydroxy compounds used to prepare b1 are fatty alcohols, alkylphenols or ethoxylated or propoxylated phenols.

7. The curable binder as claimed in claim 1, wherein the carboxy-functional polyester (b1) has an acid number of 40–800.

8. The curable binder as claimed in claim 1, wherein the compound b2 is an epoxy resin based on bisphenol A, bisphenol F, 1,6-hexanediol or 1,4-butanediol, on their own or as a mixture, and epichlorohydrin having an average molecular weight of 340–8000.

9. The curable binder as claimed in claim 1, which contains 0.01–5% by weight (with respect to the total solids content) of at least one catalyst.

10. The curable binder of claim 7 wherein the acid number is 80–650.

11. The curable binder of claim 1 wherein the b1 and b2 ratio is 40:1 to 2:1.

12. The curable binder of claim 1 wherein the b1 and b2 ratio is 30:1 to 10:1.

13. A stoving coating composition containing a curable binder of claim 1.

14. A stoving coating composition of claim 13 for food stuffs technology.

15. A process for the preparation of a curable binder as claimed in claim 1 wherein a carboxyl functional polyester b1 is reacted, optionally in the presence of a polar, aprotic solvent, with a substoichiometric amount of an epoxy compound b2, and the reaction product B is mixed at 50°–120° C. with a poly-epoxide A.

* * * * *